(12) United States Patent
Simon

(10) Patent No.: US 12,033,337 B2
(45) Date of Patent: Jul. 9, 2024

(54) METHOD FOR DETERMINING THE POSITION OF A FIRST IMAGE REGION IN A CORRESPONDENCE IMAGE, SOC AND CONTROL DEVICE, AND SYSTEM FOR CARRYING OUT THE METHOD, AND COMPUTER PROGRAM

(71) Applicant: Robert Bosch GmbH, Stuttgart (DE)

(72) Inventor: Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 17/627,345

(22) PCT Filed: Jul. 7, 2020

(86) PCT No.: PCT/EP2020/069050
§ 371 (c)(1),
(2) Date: Jan. 14, 2022

(87) PCT Pub. No.: WO2021/008926
PCT Pub. Date: Jan. 21, 2021

(65) Prior Publication Data
US 2022/0262033 A1    Aug. 18, 2022

(30) Foreign Application Priority Data
Jul. 18, 2019   (DE) .................... 10 2019 210 580.7

(51) Int. Cl.
*G06T 7/33*   (2017.01)
*G06T 7/73*   (2017.01)
(Continued)

(52) U.S. Cl.
CPC ............. *G06T 7/337* (2017.01); *G06T 7/74* (2017.01); *G06V 10/36* (2022.01); *G06V 10/44* (2022.01); *G06V 10/757* (2022.01)

(58) Field of Classification Search
None
See application file for complete search history.

(56) References Cited

U.S. PATENT DOCUMENTS 9,240,049 B2 *   1/2016   Ciurea .................. H04N 13/128
9,812,290 B2 *  11/2017   Phaneuf .................. H01J 37/26
(Continued)

FOREIGN PATENT DOCUMENTS

DE    103 56 090 B3    4/2005
DE    103 51 778 A1    6/2005
(Continued)

OTHER PUBLICATIONS

Goshtasby, A., Image registration by local approximation methods, Image and Vision Computing, Nov. 1988, pp. 255-261, vol. 6, No. 4, Butterworth & Co. (Publishers) Ltd.
(Continued)

*Primary Examiner* — Edward Park
(74) *Attorney, Agent, or Firm* — Maginot, Moore & Beck LLP

(57) ABSTRACT

A method is disclosed for determining a position of a first image region in an image corresponding to a second image region in the image. The method comprises: providing the first image region comprising a reference position; providing the image; determining a plurality of signature values for different image positions in the first image region; assigning relative offsets of a plurality of image positions in the first image region to respectively determined signature values; determining a plurality of correspondence signature values to different image positions in the image; determining relative offsets relative to determined correspondence signature values with use of the assignment; calculating target positions by summing the relative offset and corresponding image position; incrementally assigning a weighting value to a calculated target position, thus forming an incremental
(Continued)

weighting value; and determining the position of the first image region by finding an extremum in the incremental weighting values.

17 Claims, 8 Drawing Sheets

(51) Int. Cl.
*G06V 10/36* (2022.01)
*G06V 10/44* (2022.01)
*G06V 10/75* (2022.01)

(56) References Cited

U.S. PATENT DOCUMENTS

| | | | |
|---|---|---|---|
| 11,863,867 B2* | 1/2024 | Olson | G02B 21/244 |
| 2010/0215095 A1* | 8/2010 | Hayase | H04N 19/187 |
| | | | 375/E7.243 |
| 2018/0137630 A1* | 5/2018 | Ma | G06T 7/74 |
| 2022/0262033 A1* | 8/2022 | Simon | G06T 7/74 |

FOREIGN PATENT DOCUMENTS

| | | |
|---|---|---|
| DE | 10 2010 006 522 A1 | 9/2010 |
| DE | 10 2018 201 692 A1 | 8/2019 |
| WO | 2005/048195 A2 | 5/2005 |

OTHER PUBLICATIONS

Stanski, A. et al., Spiders as Robust Point Descriptors, Joint Pattern Recognition Symposium, 2005, pp. 262-268, Springer-Verlag Berlin Heidelberg.

Liang, J. et al., Camera-Based Document Image Mosaicing, The 18th International Conference on Pattern Recognition, IEEE, 2006, pp. 476-479.

International Search Report corresponding to PCT Application No. PCT/EP2020/069050, dated Oct. 9, 2020 (German and English language document) (5 pages).

* cited by examiner (a)
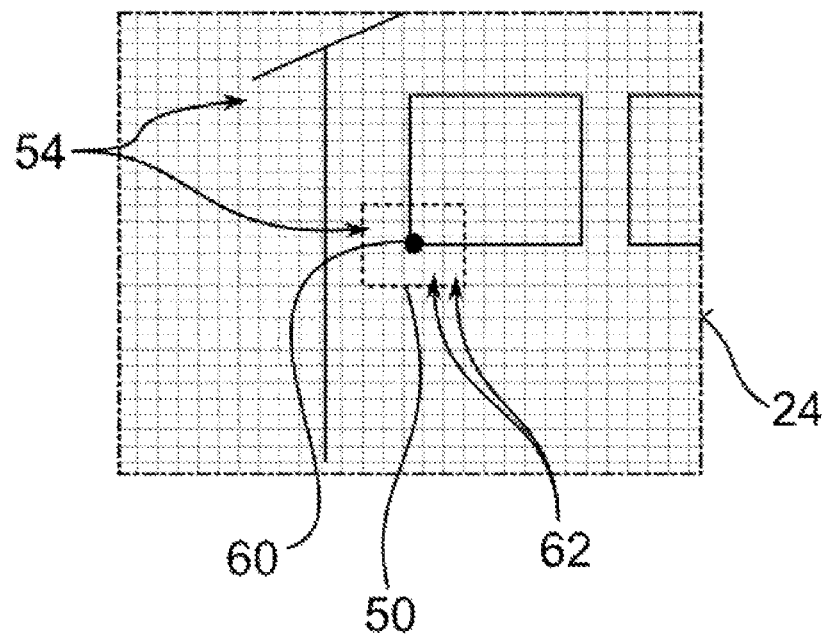
(b)
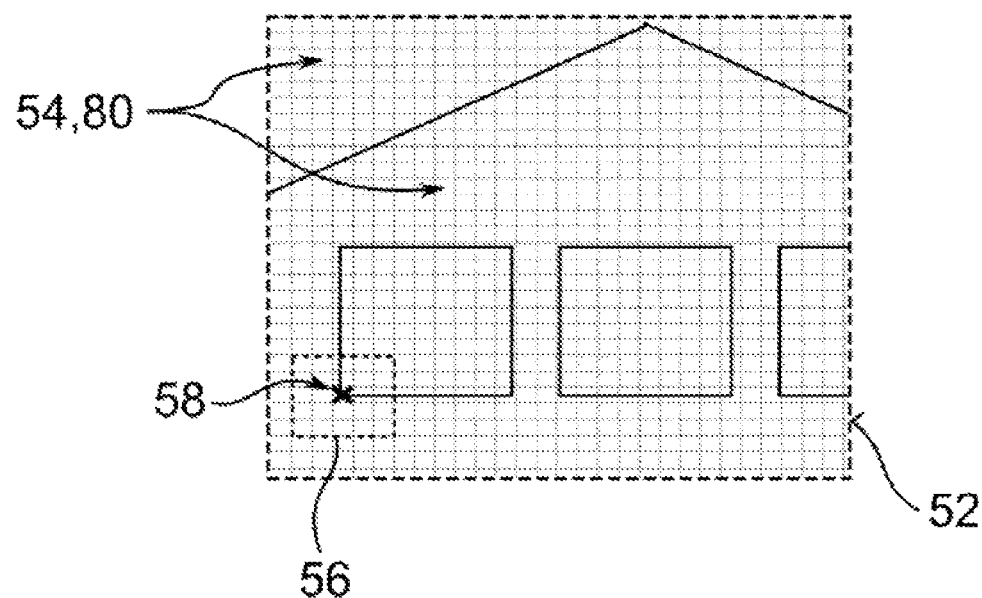
Fig. 2

(a)

|  |  |  |  |  |
|---|---|---|---|---|
| 275 | 333 | 110 | 217 | 528 |
| 709 | 418 | 333 | 1023 | 195 |
| 1001 | 773 | 823 | 400 | 489 |
| 75 | 1 | 400 | 400 | 261 |
| 911 | 911 | 634 | 301 | 680 |

(b)

|  |  |  |  |  |
|---|---|---|---|---|
| (2,2) | (1,2) | (0,2) | (-1,2) | (-2,2) |
| (2,1) | (1,1) | (0,1) | (-1,1) | (-2,1) |
| (2,0) | (1,0) | (0,0) | (-1,0) | (-2,0) |
| (2,-1) | (1,-1) | (0,-1) | (-1,-1) | (-2,-1) |
| (2,-2) | (1,-2) | (0,-2) | (-1,-2) | (-2,-2) |

Fig. 4a, b

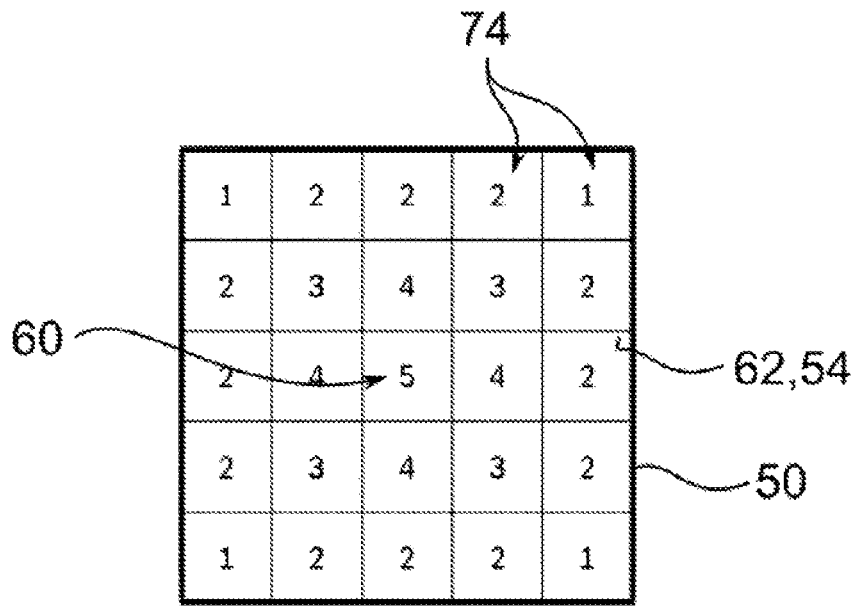
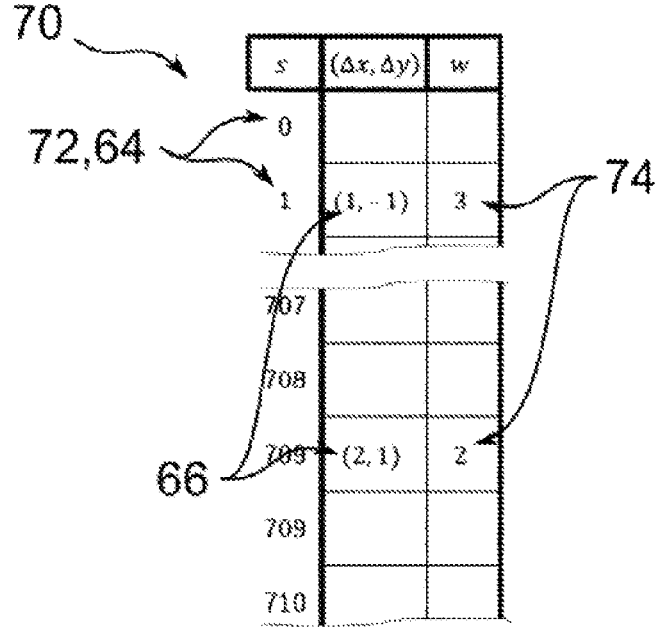
Fig. 4c, d

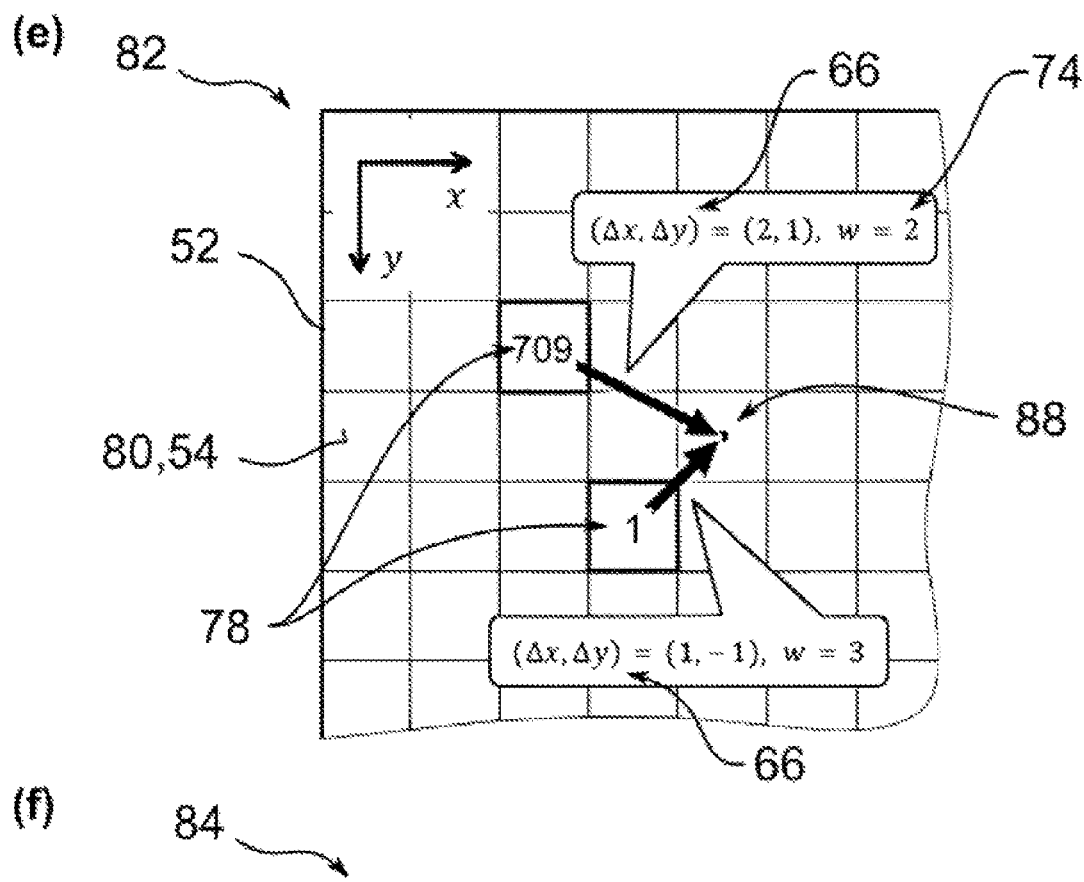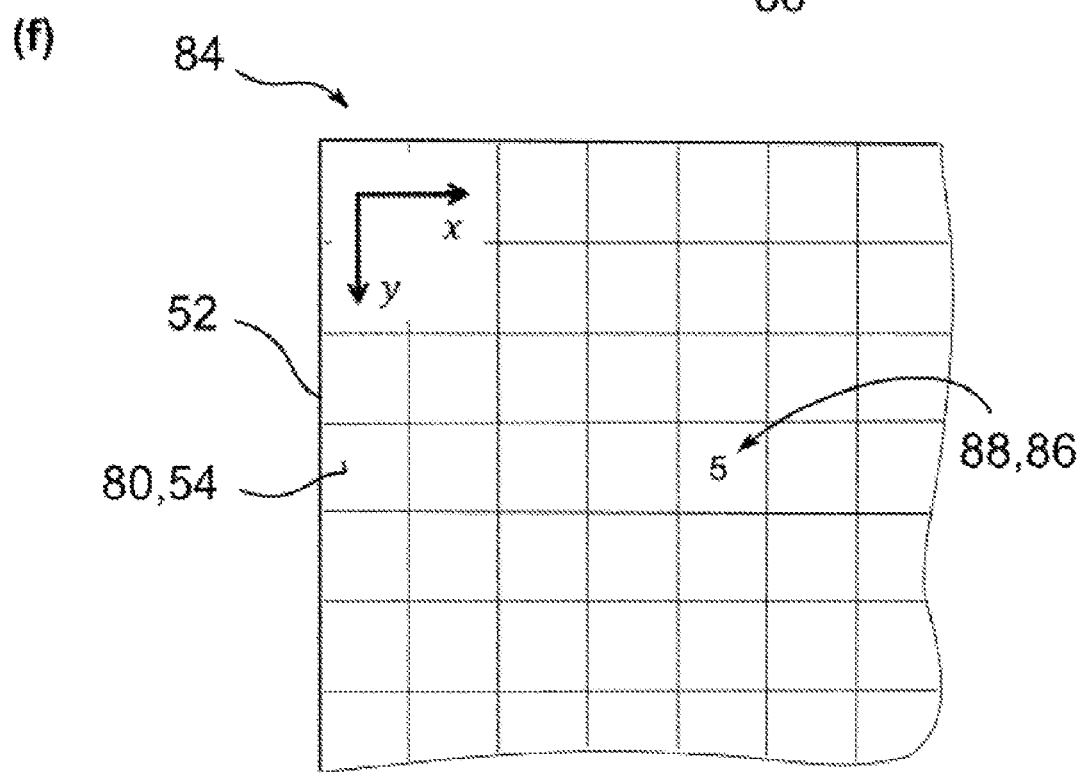
Fig. 4e, f (a)
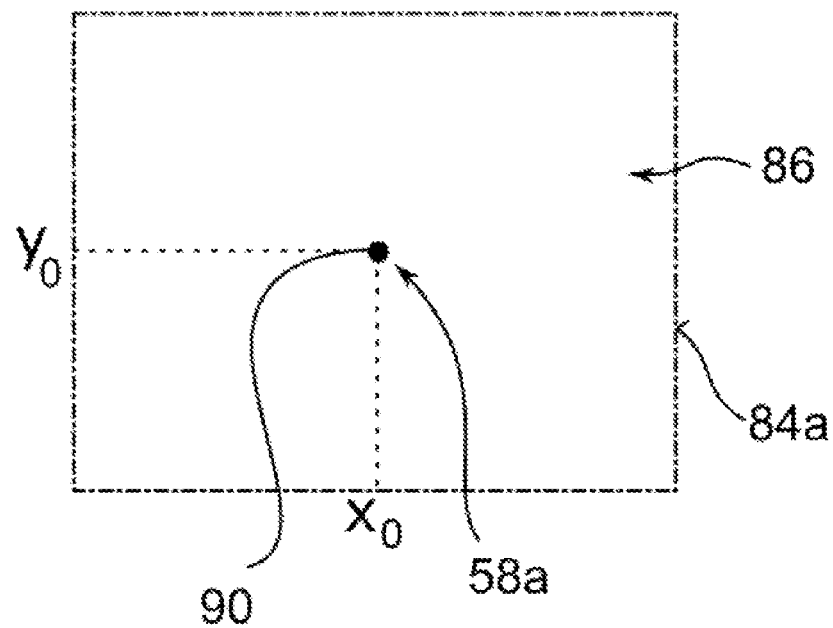
(b)
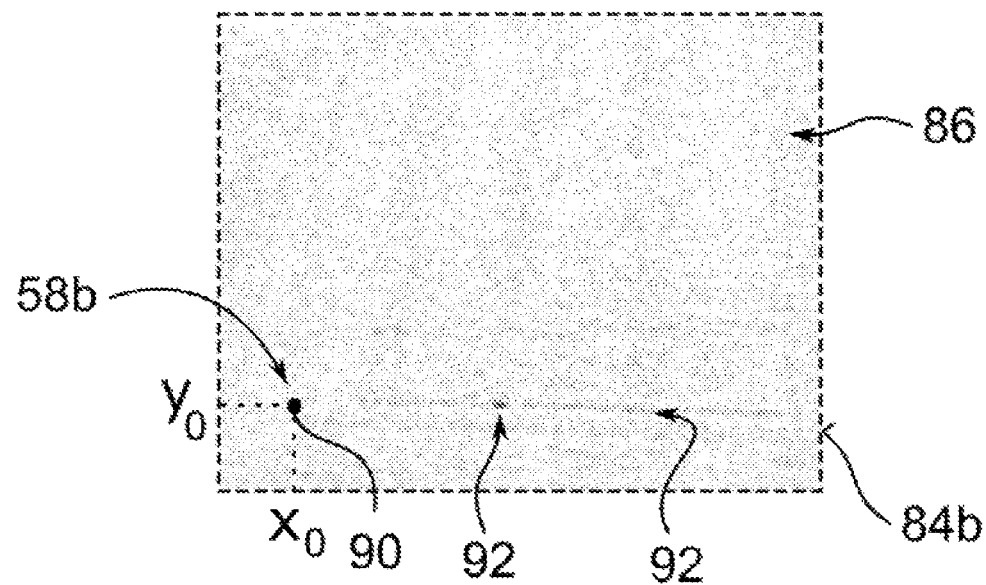
Fig. 5

METHOD FOR DETERMINING THE POSITION OF A FIRST IMAGE REGION IN A CORRESPONDENCE IMAGE, SOC AND CONTROL DEVICE, AND SYSTEM FOR CARRYING OUT THE METHOD, AND COMPUTER PROGRAM

This application is a 35 U.S.C. § 371 National Stage Application of PCT/EP2020/069050, filed on Jul. 7, 2020, which claims the benefit of priority to Serial No. DE 10 2019 210 580.7, filed on Jul. 18, 2019 in Germany, the disclosures of which are incorporated herein by reference in their entirety.

The disclosure relates to a method for ascertaining a first image region in a correspondence image. The disclosure further relates to a system-on-a-chip (SoC) and to a control device for carrying out the method. The disclosure also relates to a system, a computer-readable storage medium, and a computer program, each of which is configured to carry out the proposed method.

BACKGROUND

Different possibilities are known from the prior art for ascertaining a position of a first image region in a correspondence image, for example what is known as "block matching". The first image region is here compared with all the second image regions from the correspondence image of the same size that come into question. All the pixel pairs are compared in each of these comparisons. Each comparison here evaluates a similarity or a difference between the respectively considered pixels, for example an absolute difference between grey values. An evaluation figure for each second image region under consideration results from adding the absolute differences, wherein the total is greater as the difference between the image regions is greater. Block matching requires a large amount of computation, since the computing effort increases both with the dimensions of the first image region as well as with the dimensions of the correspondence image. Block matching is, furthermore, not very reliable, since the result is not very discriminative, i.e. a clear extremum, and thereby a unique position, cannot be ascertained.

A further possibility consists in what is known as "feature comparison", i.e. the comparison of at least one feature that has been extracted from the first image region with features that have been extracted from the correspondence image. Sequences of binary values, known as signatures, that characterize corresponding image regions are generated here. This approach is based on the assumption that image regions with a similar signature allow similar image regions to be inferred. The comparison of the signatures is then performed by a bitwise comparison of the first signature with the second signature (XOR comparison), and counting the bits that differ. The lower the result, the closer the match between the image regions. The comparison of the signatures can, however, also require a high effort, since a comparison of the signatures is necessary for each possible position in the correspondence image, wherein in each case two signatures (of, for example, 256 bits length) have to be compared bitwise. The problem can, furthermore, also arise here that the result of the feature comparison is not sufficiently discriminative.

The document DE 103 51 778 A1 discloses a method for processing image data from moving scenes. Corresponding image points or image regions are identified for this purpose in individual, sequential series of image datasets.

SUMMARY

A first aspect of the disclosure relates to a method for ascertaining a position of a first image region in a correspondence image, wherein the first image region corresponds to at least one second image region in the correspondence image. The method comprises at least the following method steps:
  providing the first image region comprising at least one reference position,
  providing the correspondence image,
  ascertaining a plurality of signature values $s_i$ for different image positions $(x_i,y_i)$ in the first image region, wherein a signature value $s_i$ characterizes a surrounding of an image position $(x_i,y_i)$ in the first image region, and wherein an image position $(x_i,y_i)$ has a relative offset $(\Delta x_i, \Delta y_i) = (x_r, y_r) - (x_i, y_i)$ in respect of the reference position $(x_r, y_r)$,
  assigning relative offsets $(\Delta x_i, \Delta y_i)$ of a plurality of image positions $(x_i, y_i)$ in the first image region for respectively ascertained signature values $s_i$,
  ascertaining a plurality of correspondence signature values $s_j$ for different image positions $(u_j, v_j)$ in the correspondence image, wherein a correspondence signature value $s_j$ characterizes a surrounding of an image position $(u_j, v_j)$ in the correspondence image,
  ascertaining relative offsets $(\Delta u_j, \Delta v_j)$ for ascertained correspondence signature values $s_j$ with use of the mapping, and
  calculating target positions $(u_0, v_0) = (u_j, v_j) + (\Delta u_j, \Delta v_j)$ in the correspondence image by adding the relative offset $(\Delta u_j, \Delta v_j)$ and the respective image position $(u_j, v_j)$,
  incrementally assigning a weighting value w to a calculated target position, thus forming an incremental weighting value w',
  ascertaining the position $(u_0, v_0)^*$ of the first image region in the correspondence image by finding an extremum in the incremental weighting values w'. The position to be ascertained corresponds here in particular to the target position associated with the extreme incremental weighting value w'.

The disclosure solves the problem of finding a position of a first image region in a correspondence image. This task often occurs in the fields of image processing, image analysis, machine vision, computer vision, and so forth. The method according to the disclosure can, for example, be used for the following applications:
  Indirect measurement of distances, wherein distances from at least two remote points are measured sequentially by means of a hand-held laser rangefinder. The laser rangefinder indirectly ascertains and outputs the distance between the two points from the two distances and the camera images recorded synchronously with each. It is possible here, according to the method of the disclosure, to find again the first image region recorded when targeting the first measurement point in the correspondence image acquired when targeting the second measurement point, and to determine its position. This makes it possible to compensate for errors caused by translation and/or rotation of the hand-held laser rangefinder, so that a tripod becomes unnecessary. DE 10 2018 201 692 A1 is known to the expert in respect of this measuring principle.

Tracking a stationary object while a camera moves past the object. A traffic sign can, for example, be tracked in this way while driving past in traffic. This possible method is used to obtain a plurality of observations of the same traffic sign having different size or resolution, and thereby to enable a reliable reading of the traffic sign.

Tracking a moving object such as a pedestrian by means of a camera in a sequence of camera images from a moving camera in a vehicle or in the context of surveillance cameras.

Successive evaluation of image displacements in the course of the navigation of autonomous robots which, when travelling relative to a surface (such as concrete or a lawn) record images of this surface by means of a camera aimed at the ground, so enabling a precise localization of the autonomous robot.

In one embodiment, the method can be implemented entirely in hardware, in particular in the form of a system-on-a-chip (SoC). In an alternative embodiment, the method can also be realized in the form of software, or through a mixture of software and hardware. The method can in particular represent a computer-implemented method that is carried out by means of a control device, for example a processor device of a computer device. To carry out the method, the control device can furthermore comprise at least one memory device in which the method is stored as a machine-readable computer program.

"Providing" means in particular that the corresponding information—here at least a first image region and a correspondence image—are transmitted for further processing to a device carrying out the method, in particular a control device or an SoC. In one embodiment of the method, the corresponding information can be realized by reading corresponding data from a file, for example by reading data stored on a data server. In another alternative or additional embodiment of the method, a first image region and/or a correspondence image can be acquired and provided using at least one imaging sensor device. In particular, a provision is conceivable using an optical camera, for example a visual camera and/or a thermal imaging camera, or using another type of imaging sensor—for example using a radar sensor, NMR sensor, 3D time-of-flight sensor or the like. It is furthermore conceivable that a first image region is provided using a first imaging sensor device, in particular a first camera, and a correspondence image is provided using a second imaging sensor device, in particular a second camera. The first imaging sensor device and the second imaging sensor device are in particular of the same type (visual cameras, for example). There can be a defined (in particular fixed) geometrical relationship between the two sensor devices. Alternatively or in addition it is conceivable that both the first image region and the correspondence image are provided using the same sensor device. For example, an acquisition and provision by the same sensor device at different points in time and/or from different perspectives is conceivable.

The disclosure concerns the efficient discovery of a first image region, in particular of a first image region from an initial image, in a correspondence image. The correspondence image can here represent a further image, or can also be the initial image itself. If the first image region corresponds to at least one second image region in the correspondence image, the first image region can be discovered. The discovery comprises the ascertainment of a position of the first image region in the correspondence image. "Ascertaining a position" here means that the first image region can be discovered uniquely in the correspondence image by giving a position—for example in the form of pixel coordinates. The method is also known as "correspondence finding". The first image region can here be significantly smaller than the correspondence image. Ascertaining the position of a first image region comprising, for example, 41*51 pixels within a correspondence image comprising 2560×1440 pixels is thus conceivable. It is also in particular possible to ascertain the position of a single image point (pixel) in the correspondence image, although a first image region is however used to carry out the method of the disclosure, wherein the first image region contains surroundings, in particular small, of the image point.

The first image region and the correspondence image comprise a plurality of image positions that can be denominated with $(x_i,y_i)$ in the first image region, and with $(u_j,v_j)$ in the correspondence image. The image positions can here be defined in particular through a pixel-resolution of the first image region or of the correspondence image. Alternatively, other types of signal-related subdivisions of the first image region or of the correspondence image into distinguishable image positions are also conceivable. In particular, it is possible to apply a transformation (such as scaling, rotation, what is known as warping (in particular image rectification for lens correction) or the like) can be applied to a signal-related subdivision of the first image region or of the correspondence image. A signal-related subdivision can, furthermore, already be made by the sensor device, for example in the case of a detection array such as in the case of a "phased array radar".

The first image region comprises at least one reference position (for example denominable as $(x_r,y_r)$), to which the ascertainment of the position of the first image region in the correspondence image is related. If, for example, it is ascertained that the first image region is found at position $(x_0, y_0)$ in the reference image, then the reference position of the first image region is indeed located at this place. In principle, the choice of reference position can be arbitrary. The reference position is in particular chosen as a pixel of the first image region. The reference position can, for example, be chosen as the geometrical center of the first image region. Alternatively, the reference position can also be chosen as a corner point or another easily recognized point of the first image region—depending, for example, on the geometry of the first image region. It is also conceivable that the reference position is not located at an integral pixel position, since it can, in principle, also be located at an arbitrary position (for example a calculated one) between the pixels. It is to be noted that an arbitrary image position $(x_i,y_i)$ in the first image region can be described in terms of the reference position by a relative offset $(\Delta x_i,\Delta y_i)$. The expression $(\Delta x_i,\Delta y_i)$ here explicitly includes the description of the offset in different coordinate systems, for example in Cartesian or non-Cartesian (e.g. polar coordinates) coordinate systems. The formation of a signature can, furthermore, relate to an image position in the first image region at the reference position (see below for explanation).

In one embodiment of the method it can be provided that the first image region and/or the correspondence image are first adjusted after they have been provided, in particular filtered, smoothed, transformed (in a linear or non-linear manner) into grey scale images, scaled, rotated, distorted, changed in resolution or the like.

In one method step according to the disclosure, a plurality of signature values $s_i$ are ascertained for different image positions $(x_i,y_i)$ in the first image region. A signature value (also known as signature), here refers in particular to a feature ascertained from data of a provided image (or image region) for a (selected or defined) image position $(x_i,y_i)$, which characterizes a surrounding of the associated image position $(x_i,y_i)$. Signature values ascertained for image positions thus have an in particular fixed mapping to the corresponding image position, in particular the coordinates of this image position. The signature values characterize the respectively assigned image positions through a computer surroundings description of the assigned image position. The signature values are preferably each ascertained by one or a plurality of simple computing operations from the adjacent data contents (in particular image information or image data) of the assigned image position, for example through multiple, in particular weighted, difference formation and/or summation of multiple grey values of image positions that are immediately adjacent or located nearby. In weighted difference formation, the weights can depend on the relative offset. The formation of signatures of this type, in particular different methods for generating or ascertaining signature values of this type, is sufficiently well-known to the expert, for example under abbreviations such as "scale-invariant feature transform (SIFT)", "speeded-up robust features (SURF))", "binary robust Independent elementary features (BRIEF)", "oriented FAST and rotated BRIEF (ORB)" or the like. In one exemplary embodiment, a signature value can be formed from the first image region, in that a test is made for two pixels located in a predefined relative arrangement within the image region as to which of the two grey values is greater, and the result is encoded in binary form as a 0 or 1. This test is repeated for a number of further pixel pairs, and a sequence of binary values consisting, for example in particular, of 8, 16 or 24 bits, is thus generated. This sequence of binary values characterizes the image region, and is known as the signature value (or also as the signature). The signature value can also be expressed as a decimal number. In principle, the approach of ascertaining a position of the first image region in the correspondence image with signature values is based on the assumption that a similar signature value of the first image region allows a similar image region of the correspondence image to be inferred, and vice versa. A comparison of signature values can in particular take place through a bitwise comparison (XOR comparison) and counting the bits that differ (a dissimilarity is thus thereby measured in this case).

According to the disclosure, a signature value is not only formed for the reference position, but for a plurality of image positions in the first image region. Signature values are, for example, ascertained for all image positions defined by pixels in the first image region, in particular for more than 90%, more than 75%, more than 50% or, most particularly, for more than 30% of all of the image positions defined by pixels in the first image region. The plurality of signature values $s_i$ for different image positions $(x_j,y_j)$ in the first image region can be ascertained in the form of a matrix or table, or in the form of a signature value image. The matrix is known here as the first signature value matrix. A signature value $s_i$ is assigned here to a corresponding image position $(x_j,y_j)$. The matrix or table, or the signature value image, can here have the same dimensions as the first image region.

It is conceivable in one embodiment of the method for ambiguities in the plurality of ascertained signature values $s_i$ to be corrected by deleting and/or merging the ambiguous signature values $s_i$. When ambiguous signature values $s_i$ are deleted, these are thus excluded from the performance of the further method. Deleting ambiguities makes it possible to provide a particularly simple method, although information does get lost. Merging ambiguities can in particular be done through a weighted averaging of relative offsets.

In one method step, relative offsets $(\Delta x_i,\Delta y_i)$ of a plurality of image positions $(x_i,y_i)$ in the first image region are assigned to the respectively ascertained signature values $s_i$. In particular, the relative offsets $(\Delta x_i,\Delta y_i)$ of a plurality of image positions $(x_i, y_i)$ in the first image region are assigned to the respectively ascertained signature values $s_i$ in a mapping specification, in particular in a lookup table. It is conceivable here to ascertain a respective relative offset $(\Delta x_i,\Delta y_i)$ of an image position $(x_i, y_i)$ with respect to the reference position from a matrix of relative offsets $(\Delta x_i,\Delta y_i)$. The relative offsets can here be provided or stored, in particular in a fixed and unchangeable form.

In one embodiment of the method, an address of the mapping specification, in particular of the lookup table, is specified using a respective signature value $s_i$. Using the signature values, a particularly efficient mapping, requiring little storage space, can be performed in this way in the mapping specification, wherein an address is specified by a respective signature value where an associated entry (i.e. at least a relative offset $(\Delta x_i,\Delta y_i)$) can be found. In one exemplary embodiment, the mapping specification, for example the lookup table, has a number of addresses that corresponds to the number of unique (in particular possible or representable) signature values. There are, for example, $2^n$ addresses for a signature length of n. Since the addresses themselves do not need any storage space—since they only need to be implicitly present and fixed in ascending sequence in a memory mapping—a method requiring particularly few resources can advantageously be given.

The method according to the disclosure further comprises a method step in which a plurality of correspondence signature values $s_j$ are ascertained for various image positions $(u_j,v_j)$ in the correspondence image. The same considerations relating to signature values and image positions of the first image region apply as above. In particular, a correspondence signature value $s_j$ characterizes a surrounding of an image position $(u_j,v_j)$ in the correspondence image. In particular, a correspondence signature value $s_j$ for an image position $(u_j,v_j)$ in the correspondence image is formed analogously, in particular in accordance with the same specification, as a signature value $s_i$ for an image position $(x_i,y_i)$ in the first image region. The plurality of correspondence signature values $s_j$ for different image positions $(u_j,v_j)$ in the correspondence image can furthermore be ascertained in the form of a matrix or table, or in the form of a correspondence signature value image. The matrix is then known as the second signature value matrix. This is particularly conceivable in a software implementation. Alternatively, the omission of storage (including temporary storage) of individual correspondence signature values $s_j$ and then processing the correspondence signature values $s_j$ immediately when they are ascertained, is also conceivable. It is therefore possible, in particular in a hardware implementation of the method according to the disclosure—for example in an SoC—for a realization with particularly reduced storage space and which therefore saves resources to be specified.

In one embodiment of the disclosure, a signature value $s_i$ and a correspondence signature value $s_j$ have a predefined length of 24 bits or less, in particular of 16 bits or less, most particularly of eight bits or less. The number of computing operations, or the computing time required to ascertain the signature values, can be reduced in this way. The size of the mapping specification, in particular the lookup table, can furthermore become very small, since its size grows exponentially ($2^n$, see above) with the number of bits n. In one exemplary embodiment, a signature value is implemented with a length of 10 bits.

With the correspondence signature value $s_j$ available, the relative offsets ($\Delta u_j, \Delta v_j$) for the ascertained correspondence signature values $s_j$ can subsequently be ascertained using the previously established mapping. For this purpose, the entry in the mapping specification corresponding to the correspondence signature value s; is in particular read i.e. by consulting the address based on the correspondence signature value $s_j$.

When the offsets have been ascertained, the target positions ($\Delta u_{j+}u_j, \Delta v_{j+}v_j$) in the correspondence image can then be calculated. A respective target position determines the image position of the reference position in the correspondence image, starting from different correspondence signatures. The calculation is done by compensating for the offset (i.e., using the present definition of the offset, by addition) of the relative offset ($\Delta u_j, \Delta v_j$) and the respective image position ($u_j, v_j$) belonging to the correspondence signature value $s_j$. In one embodiment of the method, correspondence signature values are ascertained for all the image positions in the correspondence image that are defined by pixels. In an alternative embodiment of the method, correspondence signature values are ascertained for more than 90%, for more than 75%, for more than 50% or, most particularly, for more than 30% of all the image positions defined by pixels in the correspondence image.

"Incrementally assigning a weighting value w" means in particular that a weighting value w is assigned incrementally (i.e. additively) to a calculated target position. If a weighting value is already assigned to the target position, this is increased by the newly assigned weighting value w to form the incremental weighting value w'. The weighting values w for target positions in the correspondence image can be assigned in the form of a matrix or table. The matrix is also known as the alignment matrix. In a further method step, the position ($u_0, v_0$)* of the first image region in the correspondence image is ascertained by finding an extremum, in particular a maximum, in the incremental weighting values w'. It can be provided that the ascertained incremental weighting values w' are further prepared, for example by filtering and/or smoothing, so that the result of the ascertainment thereby becomes clearer. In particular, isolated extrema (e.g. peaks) in the incremental weighting values w' can be suppressed at this stage of the method, while the extremum that is in fact being searched for, in particular the maximum, stands out more clearly. A precision can furthermore be improved in this way, since smoothing at least partially suppresses noise in the ascertained incremental weighting values w'.

In one embodiment of the method, the assigned weighting value w is selected depending on the relative offset ($\Delta u_j, \Delta v_j$), wherein the weighting value w in particular rises or falls as the relative offset increases. In an alternative embodiment of the method, the assigned weighting value w is selected depending on the relative offset ($\Delta x_i, \Delta y_i$), wherein the weighting value in particular rises or falls as the relative offset increases. A weighting value w is preferably all the greater, the closer the image position lies to the reference position and/or the more clearly the signature value is within the first image region. The weighting values w can in this way be high at those image positions at which there is a high similarity with the target position being sought, and has low values at the other (dissimilar) image positions. A respective weighting value can be calculated here, or can also be read from a matrix or table. The relative position of the image position to which a corresponding signature value belongs is in this way advantageously incorporated into the ascertainment of the target position.

In one embodiment of the method, a position ($u_0, v_0$)* of the first image region is ascertained in the correspondence image if the incremental weighting value w' assigned to the position reaches a relative or absolute threshold value. A particularly reliable ascertainment of the position can be realized in this way. A particularly robust method can be provided in this way, in particular in combination with the filtering and/or smoothing given previously.

In one embodiment of the method, a relative offset ($\Delta u_j, \Delta v_j$) of ascertained correspondence signature values $s_j$ is calculated using the mapping and a transformation variable, in particular a scaling variable and/or a rotation variable and/or a translation variable and/or a shear variable. The calculation taking account of the transformation variable can, in one embodiment, be carried out by multiplying the relative offset ($\Delta u_j, \Delta v_j$) (which represents a 2-dimensional vector) with a (2×2) matrix. In particular, a scaling can be carried out in this way depending, for example, on a change in a resolution of the first image region and of the correspondence image and/or depending on a change in an object width in the first image region and in the correspondence image. It can thus be assumed that between provision of the first image and the correspondence image, an object imaged in the sensor device has enlarged by a factor r (r>1), or shrunk (r<1) or remained the same size (r=1). Prior knowledge about this relationship (r) can, for example, be predicted from previous observations or ascertained from further available information (such as laser distance measurement data) and incorporated in the method according to the disclosure:

$$\begin{pmatrix} u_0 \\ v_0 \end{pmatrix} = \begin{pmatrix} u_j \\ v_j \end{pmatrix} + r \cdot \begin{pmatrix} \Delta u_j \\ \Delta v_j \end{pmatrix}$$

It can thus advantageously be achieved that an extremum, in particular a maximum, to be ascertained for the alignment is formed particularly clearly.

A relative rotation between the first image region and the correspondence image can furthermore be compensated for. The scalar factor r can be replaced for this purpose by a 2×2 matrix, to yield $$\begin{pmatrix} u_0 \\ v_0 \end{pmatrix} = \begin{pmatrix} u_j \\ v_j \end{pmatrix} + \begin{pmatrix} r_{1,1} & r_{1,2} \\ r_{2,1} & r_{2,2} \end{pmatrix} \cdot \begin{pmatrix} \Delta u_j \\ \Delta v_j \end{pmatrix}$$

It is in this way possible, in addition to the scaling, also to provide a rotation, a stretch, a compression and/or a shear. Such transformations are of high practical relevance, in particular when a perspective changes or has changed between the first image region and the correspondence image.

In one embodiment of the method, ambiguities are removed by deleting and/or by merging the ambiguous signature values.

In a further aspect, the disclosure relates to a system-on-a-chip (SoC) that is configured to carry out the method according to the disclosure. In particular, the SoC is configured to acquire at least one first image region and a correspondence image by means of at least one imaging sensor device and to generate an output signal depending on the ascertained position $u_0,v_0)^*$ of the first image region in the correspondence image.

In a further aspect, the disclosure relates to a control device that is configured to carry out the method according to the disclosure. A control device with at least one processor device and a memory device is in particular proposed, wherein commands are stored on the memory device which, when they are executed by the processor device, have the effect that the processor device carries out the method according to the disclosure. "Processor device" should be understood in particular to refer to a device that comprises at least one information input, an information processing unit for processing, and an information output for forwarding the processed and/or evaluated information. In one exemplary embodiment, the processor device comprises at least one processor. A "memory device" has the purpose here of holding ready a computer program necessary for the processor device to carry out one of the described methods.

Finally, a further aspect of the disclosure relates to a system comprising at least one control device according to the disclosure and/or an SoC according to the disclosure, and at least one imaging sensor device, for example a camera, that is configured to acquire and to provide a first image region and a correspondence image. The disclosure relates in particular to a vehicle, a laser rangefinder and an autonomous robot with the SoC according to the disclosure and/or the control device according to the disclosure, and at least one imaging sensor device.

In a further aspect, the disclosure relates to a computer program comprising commands which, when they are executed by means of a processor device of a control device, induce the control device to carry out the method according to the disclosure. The computer program comprises instructions that induce a control device to carry out the method according to the disclosure with all its steps when the computer program is executed.

A further aspect of the disclosure relates to a computer-readable storage medium on which the computer program according to the disclosure is placed, and in particular stored. Storage media per se are known to the expert.

"Provided" and "configured" are particularly intended to mean specially "programmed", "designed", "conceived" and/or "equipped" in the following. The fact that an object is "provided" for a specific function is in particular intended to mean that the object performs and/or executes this specific function in at least one application state and/or operating state, or that it is designed to perform the function.

The method according to the disclosure represents a particularly efficient method, which is thereby sparing of processor resources, with which only very few computing operations are necessary when ascertaining the position in the correspondence image. The proposed method is, furthermore, particularly discriminative in comparison with methods of the prior art, and therefore exhibits a particularly high reliability. These advantages are in particular achieved in that
- the first image region is described with a plurality of signature values, wherein a signature value is not only ascertained for the reference position, but for multiple image positions in the first image region;
- a mapping specification (in particular a lookup table) is used for fast access, wherein the address for the access is based directly on the signature values, in particular corresponds to the signature values or can be ascertained from the signature values with simple operations, for example through binary masking, binary XOR operations, concatenations, changes to the bit sequence, or the like;
- signatures for image positions in the first image region are used for the one-time ascertainment of the mapping specification;
- the signature values of the correspondence image are only used for reading from the mapping specification, in particular the lookup table;
- relative offsets are stored in the mapping specification which make it possible to infer the respective target position from a respective image position to a correspondence signature by allowing for the relative offset;
- a weighting value w is output at the respective target position, wherein an incremental value w' is ascertained, wherein the position at which the first image region is located in the correspondence image can be found by ascertaining an extremum in the incremental weighting values w'.

The method can advantageously be configured even more efficiently in that particularly short signature values (and correspondence signature values) are used, for example having a length of less than 24 bits.

BRIEF DESCRIPTION OF DRAWINGS

The disclosure is explained in the following description in more detail with reference to the exemplary embodiments illustrated in the drawings. The drawings and the description and the claims contain numerous features in combination. The expert will expediently also consider the features individually and merge them to form useful further combinations. The same reference signs in the figures denominate the same elements, wherein:

FIGS. 2a-2b show a schematic illustration (a) of a first image region and (b) a correspondence image on the basis of the exemplary measuring setup of FIG. 1, FIGS. 4a-4f show the matrices used and/or prepared while carrying out the method according to FIG. 3: (a) matrix of signature values, (b) matrix of relative offsets, (c) matrix of weighting values, (d) mapping specification, (e) matrix for explaining the process of an alignment, (f) matrix of incremental weighting values, FIGS. 5a-5b show schematic diagrammatic illustrations of alignment matrices.

DETAILED DESCRIPTION

Preliminary remark: The following expressions, widely used above
- $(x_i,y_i)$ for an image position in the first image region,
- $(u_j,v_j)$ for an image position in the correspondence image,
- $(\Delta x_i,\Delta y_i)$ or $(\Delta u_j,\Delta v_j)$ for a relative offset with respect to the reference position,
- $s_i$ for a signature value of an image position in the first image region,
- $s_j$ for a correspondence signature value for an image position in the correspondence image,
- $(u_0,v_0)=(u_j,v_j)+(\Delta u_j,\Delta v_j)=(\Delta u_{j+}u_j,\Delta v_{j+}v_j)$ for calculated target positions in the correspondence image, w for a weighting value,
w' for an incremental weighting value, and
$(u_0, v_0)^*$ for the ascertained position of the first image region in the correspondence image are not further reproduced below, due to the introduction of reference signs, but in principle can be applied consistently.

Figure 1:
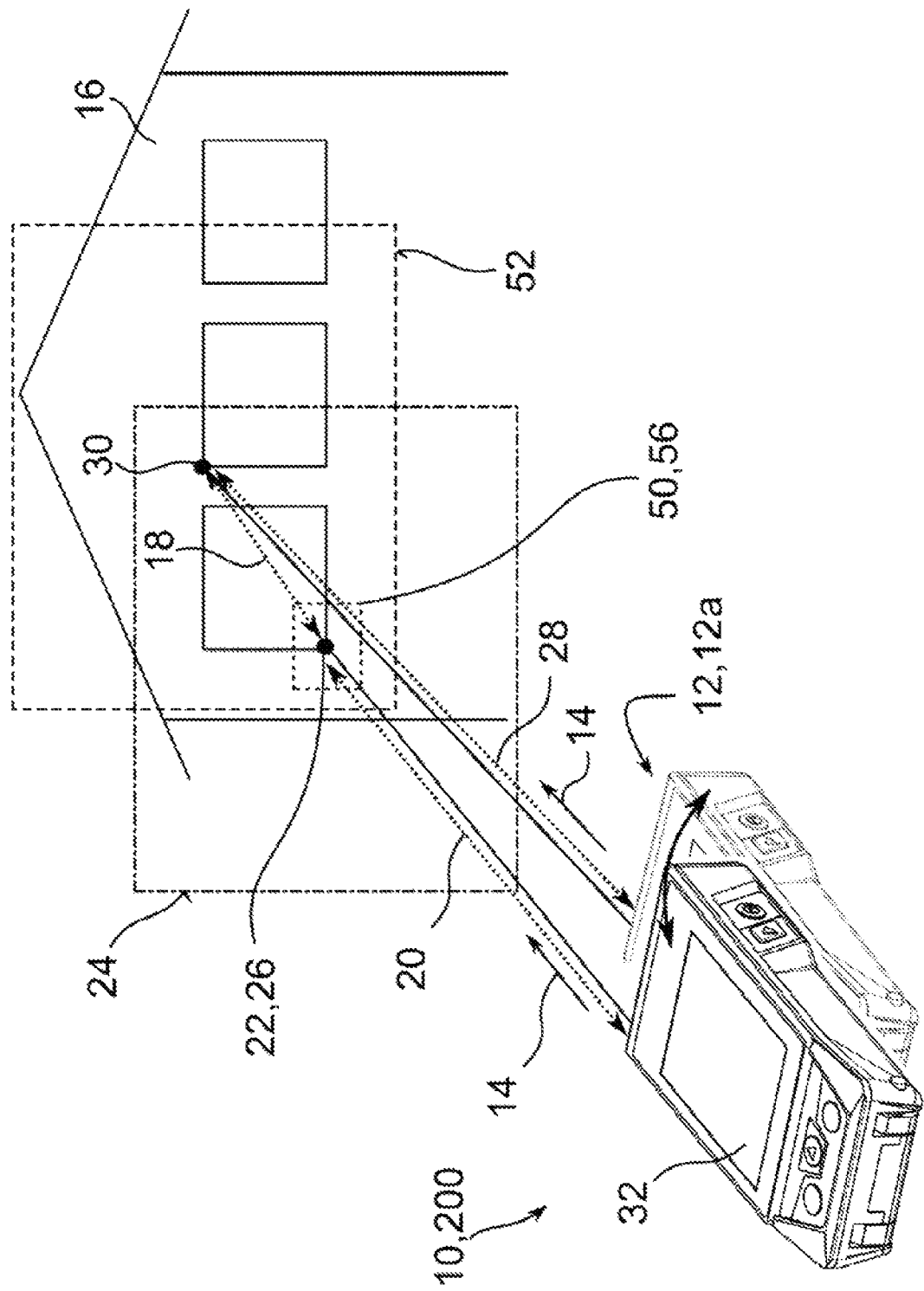
FIG. 1 shows a schematic view of a configuration of a system according to the disclosure in the form of a laser rangefinder that is located in an exemplary measuring setup.

The following description relates to FIG. 1 and to FIGS. 2a and 2b. FIG. 1 shows an application that illustrates the object of the disclosure with reference to a real example—in this case the indirect measurement of distances (also: lengths). A schematic view of a measuring setup is shown, in which a laser rangefinder 10 with an imaging sensor device 12a, realized here as a camera 12, is employed. In the illustrated embodiment, the laser rangefinder 10 is located in a three-dimensional space. The laser rangefinder 10 is configured here in such a way that a range finding device 14 is pointed toward a target object 16, shown here as a house. The aim of the user could here be that of ascertaining the distance 18 through indirect measurement in the measuring setup illustrated. A first distance 20 to a first (remote) point 22 (for example the corner 26 of a window illustrated) is measured here using the hand-held laser rangefinder 10. At the same time as carrying out the measurement of the first distance 20, by means of the laser rangefinder 10, the image 24—comprising the first image region 50—of at least one surrounding of the first point 22 is acquired by means of the camera 12 integrated into the laser rangefinder 10. The image 24 is illustrated schematically in FIG. 2a. The camera 12 is integrated for this purpose into a side of the housing that faces the remote object. A second distance 28 to a second (remote) point 30 is then measured. At the same time as carrying out the measurement of the second distance 28 to the second point 30, an image of at least one surrounding of the second point 30 is acquired—the correspondence image 52. The correspondence image 52 is illustrated schematically in FIG. 2b.

The laser rangefinder 10 indirectly ascertains the distance 18 between the first point 22 and the second point 30 from the two measured distances and the images recorded synchronously with them, and outputs it to the user by means of an output device 32. It is in particular necessary in accordance with the method 100 according to the disclosure to ascertain the most exact position possible of the first image region 50 in the correspondence image 52, in order to then determine a (possible) translation of the hand-held laser rangefinder 10 between the two distance measurements. A possible rotation of the laser rangefinder 10 between the two image recordings, which is scarcely to be avoided when holding the device by hand, is to be assumed to be known here, since it can be ascertained with economical inertial sensors (not illustrated here in more detail). This rotation can be included as prior knowledge, so that the degree of freedom of the rotation when carrying out the method 100 according to the disclosure need not be considered. Alternatively or in addition, this rotation can also be ascertained using the method 100 according to the disclosure (see description above). In particular here a possible rotation in the image plane is already applied to the first image region 50, so that the grey or color values are read from the rotated rectangular first image region 50. Interpolating the values can be advantageous here. Since the possible rotation has already been compensated for in the first image region 50, no further compensation of the rotation is necessary in the correspondence image 52. Alternatively, the rotation can also be compensated for in the correspondence image 52 alone. As a further alternative, the compensation for the rotation can be distributed in parts to the image region 50 and to the correspondence image 52.

A search is made in the correspondence image 52 for the second image region 56 whose content (i.e. image content or image data content) corresponds to the content of the first image region 50, i.e. corresponds to it or is similar to it. The first image region 50 is found here in the correspondence image 52 when the position 58 of the first image region 50 (here identified by the center of the image region 56) is ascertained in the correspondence image 52—which can be given, for instance, in pixel coordinates with reference to the correspondence image 52 (cf. coordinate data statements in FIG. 5a or 5b).

The result of this search is already anticipated in FIG. 2b, and is illustrated in the correspondence image 52 by a dashed rectangle marking the second image region 56. It is to be noted that, in contrast to this exemplary embodiment, the first image region 50 and/or the correspondence image 52 can also have a different shape, for example a rectangular, round, oval, elliptical, crescent-shaped, cruciform, polygonal, isogonal shape, or other shapes known to the expert.

The laser rangefinder 10 illustrated in FIG. 1 further comprises a control device according to the disclosure, not illustrated in more detail here, for carrying out the method 100 according to the disclosure. For this purpose, the control device of the laser rangefinder 10 comprises a computer program comprising commands which, when they are executed by means of a processor device of the control device, induce the control device to carry out the method 100 according to the disclosure. The computer program is placed on a computer-readable storage medium. The laser rangefinder 10 comprising the imaging sensor device 12a represents a system 200 according to the disclosure.

Figure 3:
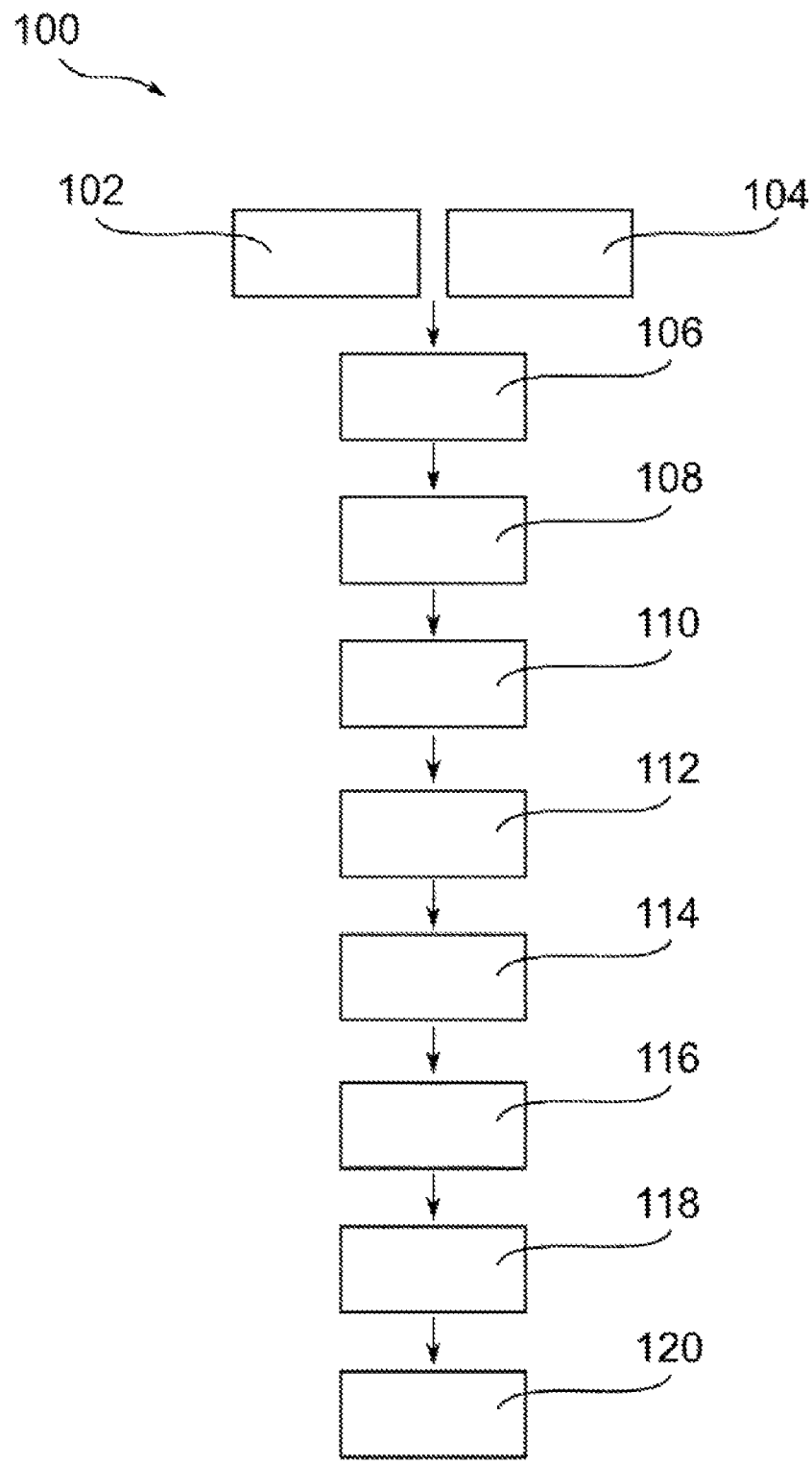
FIG. 3 shows a schematic illustration of an embodiment of the method according to the disclosure.

The flow of the method 100 according to the disclosure for ascertaining a position 58 of the first image region 50 in the correspondence image 52, wherein the first image region 50 corresponds to at least one second image region 56 in the correspondence image 52, is illustrated in FIG. 3 is a flow diagram, and is explained with reference to FIGS. 2 and 4a-4f.

In a first method step 102 the first image region 50, comprising at least one reference position 60, is provided (cf. the dashed rectangle in FIG. 2a). In this exemplary embodiment, the provision is made by means of the camera 12 as the imaging sensor device 12a of the laser rangefinder 10, as described above for the exemplary measuring setup. In this exemplary embodiment, the prepared first image region 50 cut out of the first image 24 is chosen to be somewhat larger, so that sufficient reserve is present during the ascertainment of signature values 64 to be carried out subsequently, since it is not just a single image position 62 (here chosen as an image point or pixel 54) that is considered in the ascertainment, but also its local surroundings. The correspondence image 52 is made available in method step 104 (cf. FIG. 2b). The provision is here again made by means of the camera 12 of the laser rangefinder 10. It is to be noted that the method steps 102 and 104 can take place with a time offset, wherein it may be expedient to be able to cache the first image region 50 and/or the correspondence image 52, so that the provision then takes place by reading out of a memory. Individual image positions 62 or 80 are represented in the illustrations of FIG. 2 by pixels 54 (here shown as a grid). A coordinate pair $(x_i, y_i)$ that describes the image position 62 or 80 can thus be assigned to each pixel position. As already explained, FIG. 2b already shows the result of the method, i.e. the second image region 56.

It is to be noted that in the illustrated exemplary embodiment of the method 100 according to the disclosure, exemplary image data for the first image region 50 and for the correspondence image 52 are shown which, for greater clarity, are illustrated with a size reduced to a few pixels 54 (for example, in the case of the first image region 50, to 5*5 pixels, instead of comprising, as for example in a typical application, 41*51 pixels).

In method step 106, a plurality of signature values 64 (denominable with $s_i$) are ascertained for various image positions 62 (describable by pixel coordinates $(x_i, y_i)$) in the first image region 50. A signature value 64 characterizes a surrounding of an image position 62 in the first image region 50. A respective image position 62 has a relative offset 66—describable as a distance $(\Delta x_i, \Delta y_i)$ of the pixel coordinates—with reference to the reference position 60 (cf. also FIGS. 4a and 4b). Various possible methods are known to the expert for ascertaining a signature value 64. It can, for example, contain a smoothing of the image data, followed by multiple pair-wise comparisons of pixel values from image positions 62 (pixel positions) with a predefined relative arrangement, with conversion to binary and concatenation of the individual results, wherein a binary sequence is ascertained. In this exemplary embodiment, the binary sequence has a length of 10 bits, corresponding to a value range of between 0 and 1023. The plurality of signature values 64 for different image positions 62 in the first image region 50 is ascertained in the form of a matrix, known as the first signature value matrix 68. It is assumed in the present exemplary embodiment that the first image region 50 is sufficiently large, and that a signature value 64 is ascertained for each image position 62, here given by the individual pixels 54 of the image region 50. It is to be noted that it is also, in principle, possible to ascertain more than one or less than one signature value 64 for each image position 62 (i.e. for each pixel 54).

A matrix of this sort for signature values 64 that represent the first image region 50 is illustrated in FIG. 4a. This first signature value matrix 68, as it is known, also known as the first signature image, here consists by way of example of 5*5 matrix elements. This corresponds to 5*5 image position 62 (pixels 54) in the first image region 50. A unique association between each matrix element of the signature value matrix 68 and an image position 62 in the first image region 50 exists here. The signature values 64 here have—as described—a value range from 0 to 1023.

In method step 108, relative offsets 66 of a plurality of image positions 62—possibly of all the image positions 62—in the first image region 50 are assigned to respectively ascertained signature values 64. The relative offsets 66 of the plurality of image positions 62 in the first image region 50 are assigned to respectively ascertained signature values 64 in a mapping specification 70, in particular in a lookup table. Such a mapping specification is illustrated in FIG. 4d. Using a respective signature value 64, an address 72 of the mapping specification 70, in particular of the lookup table, is specified here. In particular, a table address is specified by the respective signature value 64, at which the respective entry is made. The content of the entry comprises relative offsets 66 and weighting values 74 (denominable with w). As already described, it is conceivable that the address is not identical with the signature value, but can be ascertained indirectly from a signature value or a plurality of signature values, for example through omitting components, merging components, bit operations, calculations or the like.

In this exemplary embodiment, two further matrices, illustrated in FIGS. 4b and 4c, are used to prepare this mapping specification. A matrix of relative offsets 66 is illustrated in FIG. 4b, and is just the same size as the first signature value matrix 68. Each matrix element here contains the relative offsets 66 that must be added to the respective position of a matrix element—corresponding to an image position 62—in order to reach the reference position 60. The reference position 60 is chosen here as the center of the matrix.

For example, the entry "(2;1)" is found at the first position from the left in the second row. This means that, starting from this matrix element, one must move two fields to the right and one field downwards in order to reach the reference position 60. The x-coordinate axis assumed here points to the right and the y-coordinate axis assumed points downwards, as is usual in image processing. The matrix of relative offsets 66 is provided in this exemplary embodiment in a fixed and unchangeable form, and does not therefore have to be saved in a writeable memory.

A matrix of weighting values 74 is further illustrated in FIG. 4c, and is also just as large as the first signature value matrix 68. The weighting values 74 in this exemplary embodiment have integral values, and generally speaking fall with increasing distance from the reference position 60 (i.e. from the center of the matrix or of the first image region 50). A weighting value 74 is thus chosen depending on the relative offset 66. With a matrix of weighting values 74 chosen in this way, the effect is that signature values 64 in the vicinity of the center of the signature value matrix 68 are taken into consideration with a greater weight than signature values 64 at the edge of the signature value matrix 68. Small integer numbers are used as weighting values 74, which has the advantage that these can be described with shorter word lengths leading to a lower need for memory and bandwidth for the transmission, which is relevant and advantageous for embedded systems. The matrix of weighting values 74 is provided in changeable form in this exemplary embodiment. Zero is, in particular, also permitted as a weighting value 74, in order to be able to exclude specific signature values 64 from the alignment when, for example, a signature value 64 is ambiguous. It is to be noted that in a very simple exemplary embodiment it can also be provided that all the weighting values 74 have the value 1. In this case it is also possible, in principle, to omit the matrix of weighting values 74.

FIG. 4d shows an extract of the mapping specification 70, in particular the lookup table, filled with exemplary values, and which here has the addresses 72 in the range from 0 to 1023. A filling status is illustrated that is present after the writing of the mapping specification 70 on the basis of the signature value matrix 64 from FIG. 4a and on the basis of the matrix of relative offsets 66 from FIG. 4b and, optionally, on the basis of the matrix of weighting values 74 from FIG. 4c has taken place. At the address "1" of the mapping specification 70, a corresponding relative offset 66 with "(1;−1)" and a weighting value 74 with "3" is placed or stored. Comparing with FIG. 4a shows that the signature value "1" only occurs in the penultimate row, in the second field of the signature value matrix 68. The entry "(−1;−1)" is found at the corresponding location of the matrix of relative offsets 66 (FIG. 4b), while the entry "3" is found at the corresponding location of the matrix of weighting values 74.

The flow of writing the mapping specification 70 is as follows:

element-wise and synchronous iteration (for example in the row or column direction) through all the matrix elements of the matrices with size 5*5 matrix elements—the signature value matrix 68 (FIG. 4a), the matrix of relative offsets 66 (FIG. 4b) and the matrix of weighting values 74 (FIG. 4c);

reading signature values 64 here from the signature value matrix 68 of the relative offset 66 from the matrix of relative offsets 66, and the weighting value 74 from the matrix of weighting values 74;

jumping to the address 72 of the mapping specification 70 that is specified using the signature value 64, and entering the relative offset 66 and the weighting value 74—wherein it is assumed for the sake of simplicity in the exemplary embodiment illustrated in FIG. 4d that the signature value 64 directly represents the address 72 in the mapping specification 70.

The mapping specification 70 can contain addresses 72 at which no entry has been made. This is illustrated in FIG. 4d by empty fields. In fact, something will, however, have been entered there in practice, such as arbitrary (because irrelevant) relative offsets 66 and/or weighting values "0"—where "0" indicates, for example, the "empty state". The "empty state" can signify that the corresponding signature value 64 has not occurred in the signature value matrix 68, or that the corresponding signature value 64 has occurred too often, so that it has been deleted to avoid ambiguities. It is in particular conceivable in the case just mentioned for signature values 64 that have been deleted in order to avoid ambiguities can also be encoded with a special value, for example with "−1", in order to distinguish it from the "empty state". The addresses 72 do not themselves require any storage space, as they are only present implicitly and fixed in ascending sequence. If the mapping specification 70 is to be used again, for example in order to search for a first image region 50 in a further or in the same correspondence image 52, it can be reset by setting all of the weighting values 74 and/or the relative offsets 66 back to zero. Alternatively, and in particular requiring less effort, it is possible to go through and reset only those signature values 64 that were used and thereby changed during a previous execution of the method 100. These signature values 64 concerned can be read back again from the corresponding old (cached) first signature value matrix 68.

Repetitions of individual signature values 64 occur in this exemplary embodiment—here, for example, an accumulation of the values "333", "911" and "400" (identified by surrounding frames) in FIG. 4a. In this exemplary embodiment, an ambiguity handling is carried out in method step 108 for such cases of ambiguity, in that ambiguities are merged or deleted (not illustrated in more detail here).

According to a first option, ambiguities of signature values 64 are deleted. This means that ambiguous signature values 64 are excluded from the performance of the further method 100. This can be achieved with the aid of the mapping specification 70 described below during writing, in that, for example, when writing a weighting value 74 of "−1", the associated signature value 64 is identified as one to be excluded. The signature value 64 is then no longer available for the later correspondence search. An implementation can in practice look like this: If, when attempting to make an entry, it is established that a weighting value w greater than "0" has already been entered at an address, it is set to "−1". If it is established during a further attempt to make an entry, that "−1" has already been entered as the weighting value, then this entry is aborted, and the weighting value of "−1" is left.

According to a second option, ambiguities of signature values 64 are handled by merging. This can be done in that multiple relative offsets 66 in the mapping specification 70 are weighted by multiplication with respective associated weighting values 74: $((w_{i1} \cdot \Delta x_{i1} + W_{i2} \cdot \Delta_{i2} \cdot \Delta x_{i2} + \ldots)/(w_{i1} + w_{i2} + \ldots); (w_{i1} \cdot \Delta y_{i1} + W_{i2} \cdot \Delta y_{i2} + \ldots)/(W_{i1} + w_{i2} + \ldots))$. The division by $(w_{i1} + w_{i2} + \ldots)$ can, for the sake of simplicity, also be postponed to a later time (for example after the last signature value 64 has been entered).

In method step 110, a plurality of correspondence signature values 78 (denominated with $s_j$) for different image positions 80 (denominable with $(u_j, v_j)$) are ascertained in the correspondence image 52, wherein a correspondence signature value 78 characterizes a surrounding of an image position 80 in the correspondence image 52. The correspondence signature values 78 for image positions 80 in the correspondence image 52 are formed similarly, in particular formed according to the same specification as the signature values 64 for image positions 62 in the first image region 50. The result is a second signature value matrix 82 (also known as the second signature image), as is illustrated in FIG. 4e. It is to be noted that the second signature value matrix 82 has an "empty edge", since, in order to ascertain correspondence signature values 78, a local neighborhood is required, and this is not the case everywhere close to the edge of the image, as a result of which a valid correspondence signature value 78 cannot be ascertained everywhere. The "empty edge" can be implemented here either by omitting rows or columns of the second signature value matrix 82, or by means of marking correspondence signature values 78 as "invalid", for example by means of a special signature value or through a weighting value of "0". It can also be advantageous for the second signature value matrix 82 to carry out a treatment of ambiguities—and to do this regardless of whether or not this has been performed for the first signature value matrix 68. It is to be noted that the second signature value matrix 82 does not necessarily have to exist in its entirety. In particular, it is not necessary for the second signature value matrix 82 to be stored. It can, instead, be sufficient to save just a fraction of it, for example only as many matrix rows of correspondence signature values 78 as are necessary for handling the ambiguities—or even just to hold a single correspondence signature value 78 ready, since the correspondence signature value 78 is only required briefly, and can then be forgotten. This enables an implementation of the method 100 with a very low memory requirement, which makes it interesting, for example, for cost-critical embedded systems.

The following method steps 112-116 represent carrying out an alignment with the aim of ascertaining an alignment matrix 84 (also known as an alignment image or alignment weight matrix), in particular having the size of the second signature value matrix 82 (the empty edge perhaps having been removed, see above), wherein the alignment matrix 84 contains high values at those matrix elements at which a high similarity with the sought-for position 58 is present, and low values at the other (dissimilar) positions. Since weighting values have to be entered at the image positions $(\Delta u_j + u_j, \Delta v_j + v_j)$ during the alignment, it may furthermore also be helpful to select the alignment matrix 84 exactly large enough that it is always possible to enter weighting values 74—i.e. that no weighting values 74 land outside the alignment matrix 84.

Relative offsets 66 (now denominable as $(\Delta u_j, \Delta v_j)$) for ascertained correspondence signature values 78 are ascertained in method step 112 using the mapping specification 70. FIG. 4e makes clear how the alignment proceeds illustratively. The image illustrated relates to the second signature value matrix 82, which is representative of the content of the correspondence image 52. This second signature value matrix 82 is in particular processed element-by-element, for example by rows starting from the top left. If a valid correspondence signature value 78—in this case "709"—is present at the respective image position 80 (matrix position), then at the address 72 of the mapping specification 70, in particular the lookup table, that corresponds to the correspondence signature value 78, a check is made as to whether a valid entry is present, i.e., in this exemplary embodiment, whether the weighting value 74 stored there is greater than zero. If that is the case, the relative offsets 66 and the weighting value 74 stored there are read—in this case the relative offset "(2;1)", and the weighting value "2". The mapping specification 70 is correspondingly referred to again when carrying out the alignment, but this time only for reading. In this case, for each valid correspondence signature value 78, in particular from the second signature value matrix 82, the address 72 of the mapping specification 70 specified by the correspondence signature value 78 is accessed and—if they exist—the stored relative offsets 66 and the weighting value 74 are read from there.

In method step 114, target positions (denominable as $(u_0,v_0)=(u_j,v_j)+(\Delta u_j,v_j)=(\Delta u_{j+}u_j,\Delta v_{j+}v_j)$) in the correspondence image 52 are calculated by adding the relative offset 66 ($\Delta u_j,\Delta v_j$) and the relative image position 80 ($u_j,v_j$) in the correspondence image 52. A scaling, preferably a rotation, extension/compression and shear, can also optionally be compensated for at this point. Weighting values 74 for target positions in the correspondence image 52 in the form of the alignment matrix 84 are assigned here—cf. FIG. 4f. In this exemplary embodiment, the alignment matrix 84 has the same size as the second signature value matrix 82, and is initialized before the preparation starts (for example set to zero everywhere or to "empty"). In method step 116, an incremental weighting value 86 (denominable as w') at the ascertained target position 88 in the alignment matrix 84 is then increased—as far as this is valid—by incrementally assigning the weighting value 74. Further in the process—cf. two rows and one column later in FIG. 4e—the correspondence signature value 78 reaches "1". The relative offset 66 is stored (1:–1), and the weighting value is stored as "3" at the corresponding address 72 of the mapping specification 70 (cf. FIG. 4e). In this exemplary embodiment, this therefore yields the same target position 88 in the alignment matrix 84 as previously in the correspondence signature value 78 of "709". The previously stored incremental weighting value 86 of "2" is thus now increased by "3" to "5" (the value "5" is illustrated in FIG. 4f). In this way it is demonstrated how the expected relative arrangement of the corresponding signature values 78 (compare the relative arrangement of the signature value "709" and "1" in relation to the target position 88 in FIG. 4e with the relative arrangement of the signature value 64 having the same name in relation to the reference position 60 in FIG. 4a) leads to an increase in the incremental weighting value 86 which finally leads to the sought-for position 58. It is to be noted that nothing more needs to be done at matrix elements of the second signature value matrix 82 that do not have a valid correspondence signature value 78 (represented as empty fields). It is also conceivable that a special signature value such as "–1", "0" or "1024" is provided for invalid fields of this type.

As a result of quantizations to a pixel grid, rounding inaccuracies, interpolation errors, changes to distance and to perspective between the first image region 50 and the correspondence image 52, it can happen that the incremental weighting values 86, which should ideally be concentrated in one image position 80 (i.e. in one matrix element), are scattered or "spread" across a plurality of adjacent image positions 80. This scattering can be effectively compensated for by a post-processing step, for example through the application of a linear and location-invariant smoothing filter to the alignment matrix 84. Such filtering leads to a clearer extraction of the sought-for local extrema 90, in particular maxima, and can make the search easier, or reduce the uncertainty of the search, since when considering the relationships, weak adjacent extrema 92, in particular adjacent maxima, tend to be suppressed, and the strong extrema, in particular maxima, tend to be emphasized.

Finally, in a method step 118, the position 58 (denominable as $(u_0,v_0)^*$) of the first image region 50 in the correspondence image 52 is ascertained by finding an extremum 90, in particular a maximum, in the incremental weighting values 86 of the alignment matrix 84. It is to be noted that the alignment matrix 84 also does not have to be explicitly or completely stored at any time. It can be sufficient for matrix elements or alignment values for the "winner" (global extremum or maximum) of the alignment, and possibly for a second or third "winner" (local extrema or maximum) etc. to be passed on to a further evaluation, in particular a further method step 120 of the evaluation. In the further evaluation it is, for example, possible to check whether the incremental weighting value 86 or the incremental weighting values 86 for a winner is/are sufficiently unambiguous, and whether a sufficiently significant distance from an incremental weighting value 86 for a further image position 80 (i.e. from the second "winner") is present in the correspondence image 52. The position 58 of the first image region 50 is accordingly ascertained in the correspondence image 52 if the incremental weighting value 86 assigned to the position 58 reaches a relative or absolute threshold value.

It is to be noted that the alignment matrix 84 does not have to be stored in its entirety, although it can be helpful to keep the part onto which weighting values 74 may still be placed in the memory. Since the vectors ($\Delta u_j,\Delta v_j$) of the offset 66 are typically not very long, a "range" in the alignment is very limited, so that weighting values 74 are only placed on a relatively narrow strip of the alignment matrix 84. It is therefore conceivable to evaluate that part of the alignment matrix 84 as soon it is no longer within the range of the alignment—i.e. no longer in the range of the offset 66—so that this no longer has to be stored.

Two alignment matrices 84a, 84b for the exemplary measuring setup of FIG. 1 are illustrated in FIG. 5. The incremental weighting values 86 of the respective alignment matrix 84a, 84b are represented here as grey values in a pictorial illustration, wherein a darker grey value corresponds to a higher value of the underlying incremental weighting value 86. The alignment matrix 84a in FIG. 5a relates to the ascertainment of the position 58a of the first image region 50 in the first image 24, while the alignment matrix 84b in FIG. 5b relates to the ascertainment of the position 58b of the first image region 50 in the correspondence image 52. It can easily be seen that a clear extremum 90 is present in the alignment matrix 84a. The alignment matrix 84b also exhibits a clearly formed extremum 90 that marks the position 58b of the first image region 50 in the correspondence image 52, while further adjacent extrema 92 are less clearly visible. The consideration of the respective values making use of a threshold value finally makes it possible to identify the position 58b as the global extremum.

It is to be noted that the alignment matrix 84a is not in practice absolutely necessary. It is, however, conceivable optionally to use the alignment matrix 84a in order to establish in advance (in the same image, i.e. in the first image 24) whether unfavorable ambiguities are present, and how close these come to a proper candidate. This prior knowledge could be used during the later evaluation of the correspondence image 52, for example as information regarding how markedly and how close a second "winner" lies and/or whether a second "winner" is or is not still contained in the correspondence image.

Figure 6:
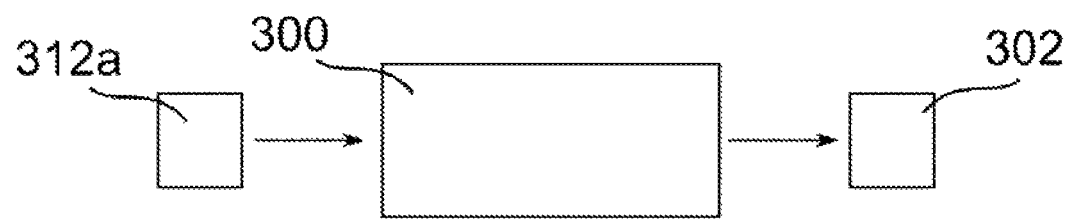
FIG. 6 shows a schematic illustration of a system-on-a-chip according to the disclosure.

An SoC 300 for carrying out the method according to the disclosure 100 is illustrated in FIG. 6. The SoC 300 comprises a first image region 50 and a correspondence image 52 using an imaging sensor device 312a of the SoC 300. The SoC 300 is configured here to ascertain a position 58 of the first image region 50 in the correspondence image 52, and, depending on that, to generate or output an output signal 302.

The invention claimed is:

1. A method for determining a position of a first image region in a correspondence image that corresponds to at least one second image region in the correspondence image, the method comprising:
   providing the first image region having at least one reference position;
   providing the correspondence image;
   ascertaining a plurality of signature values for different image positions in the first image region, each signature value in the plurality of signature values characterizing a surrounding of a respective image position of the different image positions in the first image region, each image position having a relative offset with respect to the at least one reference position;
   assigning first relative offsets of the different image positions in the first image region to respective signature values of the plurality of signature values;
   ascertaining a plurality of correspondence signature values for different image positions in the correspondence image, each correspondence signature value in the plurality of correspondence signature values characterizing a surrounding of a respective image position of the different image positions in the correspondence image;
   ascertaining second relative offsets for the plurality of correspondence signature values using a mapping;
   calculating target positions in the correspondence image by adding the second relative offsets to the different image positions in the correspondence image;
   incrementally assigning weighting values to the calculated target positions to form incremental weighting values; and
   ascertaining the position of the first image region in the correspondence image by finding an extremum in the incremental weighting values.

2. The method as claimed in claim 1, wherein:
   the ascertaining the plurality of signature values further comprises ascertaining the plurality of signature values one of (i) in a form of a matrix and (ii) in a form of a table; and
   the ascertaining the plurality of correspondence signature values further comprises ascertaining the plurality of correspondence signature values one of (i) in a form of a matrix and (ii) in a form of a table.

3. The method as claimed in claim 1, the assigning the first relative offsets further comprising:
   assigning the first relative offsets using a mapping specification.

4. The method as claimed in claim 3, wherein a respective signature value of the plurality of signature values specifies an address of the mapping specification.

5. The method as claimed in claim 3, wherein the mapping specification is a lookup table.

6. The method as claimed in claim 1, the incrementally assigning the weighting values further comprising:
   incrementally assigning the weighting values one of (i) in a form of a matrix and (ii) in a form of a table.

7. The method as claimed in claim 1, wherein a correspondence signature value of the plurality of correspondence signature values is formed using a same specification as a signature value of the plurality of signature values.

8. The method as claimed in claim 1, the incrementally assigning the weighting values further comprising:
   selecting the weighting values depending on respective ones of the second relative offsets, such that the weighting values one of (i) rise and (ii) fall as the respective second relative offsets increase.

9. The method as claimed in claim 1, the ascertaining the position of the first image region further comprising:
   ascertaining the position of the first image region in response to if the incremental weighting value assigned to the position reaching one of (i) a relative threshold value and (ii) an absolute threshold value.

10. The method as claimed in claim 1, the ascertaining the second relative offsets further comprising:
    ascertaining the second relative offsets using the mapping and a scaling value.

11. The method as claimed in claim 1 further comprising:
    correcting ambiguities in the plurality of signature values by at least one of (i) deleting and (ii) merging ambiguous signature values $s_i$ in the plurality of signature values.

12. The method as claimed in claim 1, wherein at least one of the first image region and the correspondence image is acquired and provided using at least one imaging sensor device.

13. The method as claimed in claim 1, wherein the method is carried out by a control device.

14. The method as claimed in claim 1, wherein the method is carried out by executing commands of a computer program with a processor device of a control device.

15. The method as claimed in claim 1, wherein the computer program is stored on a computer-readable storage medium.

16. A SoC (System-on-a-Chip) for determining a position of a first image region in a correspondence image that corresponds to at least one second image region in the correspondence image, the SoC being configured to:
    acquire the first image region having at least one reference position;
    acquire the correspondence image;
    ascertain a plurality of signature values for different image positions in the first image region, each signature value in the plurality of signature values characterizing a surrounding of a respective image position of the different image positions in the first image region, each image position having a relative offset with respect to the at least one reference position;
    assign first relative offsets of the different image positions in the first image region to respective signature values of the plurality of signature values;
    ascertain a plurality of correspondence signature values for different image positions in the correspondence image, each correspondence signature value in the plurality of correspondence signature values characterizing a surrounding of a respective image position of the different image positions in the correspondence image;

ascertain second relative offsets for the plurality of correspondence signature values using a mapping;

calculate target positions in the correspondence image by adding the second relative offsets to the different image positions in the correspondence image;

incrementally assign weighting values to the calculated target positions to form incremental weighting values;

ascertain the position of the first image region in the correspondence image by finding an extremum in the incremental weighting values; and generate an output signal depending on the ascertained position of the first image region in the correspondence image.

17. A system for determining a position of a first image region in a correspondence image that corresponds to at least one second image region in the correspondence image, the system comprising:

at least one imaging sensor device configured to acquire and prepare (i) the first image region having at least one reference position and (ii) the correspondence image; and at least one control device configured to:
acquire the first image region having at least one reference position;
acquire the correspondence image;
ascertain a plurality of signature values for different image positions in the first image region, each signature value in the plurality of signature values characterizing a surrounding of a respective image position of the different image positions in the first image region, each image position having a relative offset with respect to the at least one reference position;
assign first relative offsets of the different image positions in the first image region to respective signature values of the plurality of signature values;
ascertain a plurality of correspondence signature values for different image positions in the correspondence image, each correspondence signature value in the plurality of correspondence signature values characterizing a surrounding of a respective image position of the different image positions in the correspondence image;
ascertain second relative offsets for the plurality of correspondence signature values using a mapping;
calculate target positions in the correspondence image by adding the second relative offsets to the different image positions in the correspondence image;
incrementally assign weighting values to the calculated target positions to form incremental weighting values; and
ascertain the position of the first image region in the correspondence image by finding an extremum in the incremental weighting values.

* * * * *

UNITED STATES PATENT AND TRADEMARK OFFICE
CERTIFICATE OF CORRECTION

Page 1 of 1

PATENT NO. : 12,033,337 B2
APPLICATION NO. : 17/627345
DATED : July 9, 2024
INVENTOR(S) : Simon It is certified that error appears in the above-identified patent and that said Letters Patent is hereby corrected as shown below:

In the Claims

In Claim 9, at Column 20, Line 20: "in response to if the incremental weighting value" should read --in response to the incremental weighting value--.

Signed and Sealed this
Fourth Day of February, 2025

Coke Morgan Stewart
*Acting Director of the United States Patent and Trademark Office*